(12) United States Patent
Yoneno

(10) Patent No.: US 6,499,847 B1
(45) Date of Patent: Dec. 31, 2002

(54) PROJECTION SYSTEM AND PROJECTOR

(75) Inventor: Kunio Yoneno, Shiojin (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/700,544

(22) PCT Filed: Mar. 21, 2000

(86) PCT No.: PCT/JP00/01721

§ 371 (c)(1),
(2), (4) Date: Nov. 27, 2000

(87) PCT Pub. No.: WO00/57245

PCT Pub. Date: Sep. 28, 2000

(30) Foreign Application Priority Data

Mar. 19, 1999 (JP) .......................................... 11-0747551

(51) Int. Cl.$^7$ ............................................. G03B 21/14
(52) U.S. Cl. ......................................... 353/70; 353/101
(58) Field of Search ........................... 353/69, 70, 101, 353/100, 121, 122; 348/14.07, 745, 806, 14.01, 14.1

(56) References Cited

U.S. PATENT DOCUMENTS

| | | | | |
|---|---|---|---|---|
| 3,963,337 A | * | 6/1976 | Lundberg | 353/70 |
| 5,455,647 A | * | 10/1995 | Fujiwara | 353/101 |
| 5,597,223 A | * | 1/1997 | Watananabe et al. | 353/97 |
| 5,795,046 A | * | 8/1998 | Woo | 353/69 |
| 5,895,110 A | * | 4/1999 | Okada et al. | 353/31 |
| 2001/0005262 A1 | * | 6/2001 | Tsurushima | 353/121 |

FOREIGN PATENT DOCUMENTS

| | | |
|---|---|---|
| JP | A-2-170193 | 6/1990 |
| JP | A-2-306294 | 12/1990 |
| JP | A-4-181857 | 6/1992 |
| JP | A-4-346309 | 12/1992 |
| JP | A-6-3577 | 1/1994 |
| JP | A-6-6816 | 1/1994 |
| JP | A-6-160796 | 6/1994 |
| JP | A-6-242884 | 9/1994 |
| JP | A-7-129322 | 5/1995 |
| JP | A-7-154807 | 6/1995 |
| JP | A-7-225428 | 8/1995 |
| JP | A-8-95707 | 4/1996 |
| JP | A-8-237407 | 9/1996 |
| JP | A-9-62444 | 3/1997 |

* cited by examiner

Primary Examiner—William Dowling
(74) Attorney, Agent, or Firm—Oliff & Berridge PLC

(57) ABSTRACT

A projection system includes a projecting portion for projecting image light onto a predetermined projection receiving portion, an image taking portion for taking a projected image obtained by the projecting portion, and a processing portion for performing a predetermined processing based on the image taking result obtained by the image taking portion. An image taking lens of the image taking portion is arranged outside the reflection region of the direct reflection light of the projected image.

10 Claims, 6 Drawing Sheets

PROJECTION SYSTEM AND PROJECTOR

BACKGROUND OF THE INVENTION

1. Field of the Invention

The present invention relates to a projection system and a projector for imaging a projected image using an imaging portion.

2. Description of Related Art

When presenting of an image by projecting the image onto a screen or the like using a projector (projective type display apparatus), the person who explains the projected image does so in front of the image by indicating the projected image using an indicating stick, a laser pointer or the like.

In such a presentation, the projected image and the designated image on the projected image are taken using a CCD camera or the like. In the image taken, the shadow of the indicating stick or fingers is detected as a low luminance region. From the configuration of the shadow, a pointing position is detected, or by detecting a high luminance region of the laser pointer, a pointing position is detected, whereby a cursor or a predetermined image is displayed in the projected image corresponding to the pointing position, or a predetermined program processing corresponding to the pointing position is performed to display the resulting image, thereby providing a presentation system for supporting presentations.

SUMMARY OF THE INVENTION

In the case of the above apparatus, when a dedicated screen is used as a portion onto which projection is performed, there is no problem since the diffusability of light is high. When, however, a portion onto which images are to be projected that includes a highly reflective member in its surface, such as a white board, is used as a screen, a high luminance region called hot spot may be generated on the white board, depending upon the position from which the image is viewed. This hot spot is a high luminance portion in the projected image which can be seen when the light source image of the light source lamp of the projector is reflected by the screen including the highly reflective member.

Thus, depending upon the position of the CCD camera, there is an influence of the hot spot. When detecting the pointing position from the distribution of the variation in luminance in the projected image, the detection of the pointing position cannot be correctly done due to the hot spot reflected light, and in some case, various proceedings based on the image taking result may not be correctly conducted.

The present invention has been made in view of the above problem. It is accordingly an object of the present invention to provide a projection system and a projector capable of reducing the influence of the hot spot and capable of processing image taking data in a satisfactory manner.

In accordance with the present invention, to achieve the above object, there is provided a projection system which may consist of a projecting portion for projecting image light onto a predetermined projection receiving portion, an image taking portion for taking a projected image obtained by the projecting portion, and a processing portion for performing a predetermined processing based on the image taking result obtained by the image taking portion, wherein an image taking lens of the image taking portion is arranged outside the reflection region of the direct reflection light of the projected image.

In accordance with the present invention, to achieve the above object, there is provided a projector which may consist of a projecting portion for projecting image light onto a predetermined projection receiving portion, and an image taking portion for taking a projected image obtained by the projecting portion, wherein an image taking lens of the image taking portion is arranged outside the reflection region of the direct reflection light of the projected image.

In these inventions, the projection light projected by the projecting portion is directly reflected by the projection receiving portion (screen) and the reflected light returns to the projecting portion, the image taking lens for taking the projected image projected onto the projection receiving portion being arranged outside the reflection region of the returning reflected light, whereby the influence of the hot spot is reduced, and it is possible to obtain correct image taking data and to process the image taking data in a satisfactory manner. In particular, as in a CCD camera, the image taking portion converts light intensity (luminance) to an electric signal, so that when the reflection of the hot spot enters the image taking area of the CCD, that portion alone exhibits high luminance, and it is difficult to detect the pointing position indicated by the person who explains in front of the screen. In the present invention, however, it is designed such that the reflection from the projection receiving portion is not taken in by the image taking lens, so that the image recognition by image taking is correct.

As the predetermined processing, for example, the position of indication on the projection receiving portion is detected by an indicating stick, a laser pointer or the like indicated in the projected image.

Preferably, the projecting portion includes a projection optical system, and when the projection optical system is a gate projection optical system which projects projection light upwardly, the image taking lens of the image taking portion is arranged at a position lower than the lower end of the projection region by the projecting portion, and when the projection optical system is a gate projection optical system which projects projection light downwardly, the image taking lens of the image taking portion is arranged at a position higher than the upper end of the projection region by the projecting portion.

Due to this arrangement, the image taking lens is arranged outside the reflection region of the reflected light obtained through direct reflection of the projection light at the projection receiving portion, and even when an image is projected onto a projection receiving portion formed of a highly reflective member, it is possible to reduce the influence of the hot spot, obtain correct image taking data, and process the image taking data in a satisfactory manner.

In an embodiment, the projecting portion and the image taking portion are formed integrally.

In this arrangement, the projecting portion and the image taking portion are formed integrally, whereby the position and angle of each portion can be easily adjusted.

Preferably, with respect to the optical axis of the projecting portion, the image taking angle of the image taking lens can be adjusted.

In this arrangement, even when the position of the projecting portion and the projection angle are changed, the image taking portion can be adjusted accordingly, whereby it is possible to correctly obtain the image taking data.

Preferably, the projection receiving portion is formed of a highly reflective material having a predetermined reflectance.

In this arrangement, even when an image is projected onto a projection receiving portion formed of a highly reflective material which is subject to generation of a hot spot, it is possible to reduce the influence of the hot spot, obtain correct image taking data, and process the image taking data in a satisfactory manner.

Examples of the projection receiving portion include a white board and a concrete wall.

BRIEF DESCRIPTION OF THE DRAWINGS

FIGS. 2(A)–(B) show an ordinary projection optical system, of which FIG. 2(A) is a principle diagram showing the ordinary projection optical system, and FIG. 2(B) is a diagram showing a projection image region in the ordinary projection optical system projected onto a projection receiving portion.

FIGS. 3(A)–(B) show a projection optical system consisting of a gate projection optical system, of which FIG. 3(A) is a principle diagram showing the gate projection optical system, and FIG. 3(B) is a diagram showing a projection image region in the gate projection optical system projected onto a projection receiving portion.

DETAILED DESCRIPTION OF PREFERRED EMBODIMENTS

In this embodiment, a projection system will be described, in which an image is projected for display onto a screen or the like using a projector (projective type display apparatus) having a projecting portion, the image projected for display being taken by a CCD camera constituting an image taking portion, the detection of the pointing position or the like by an indicating stick or a laser pointer indicated by a person who explains and performs presentation in the projected image being performed in a predetermined processing portion on the basis of the image taking result.

Figure 1:
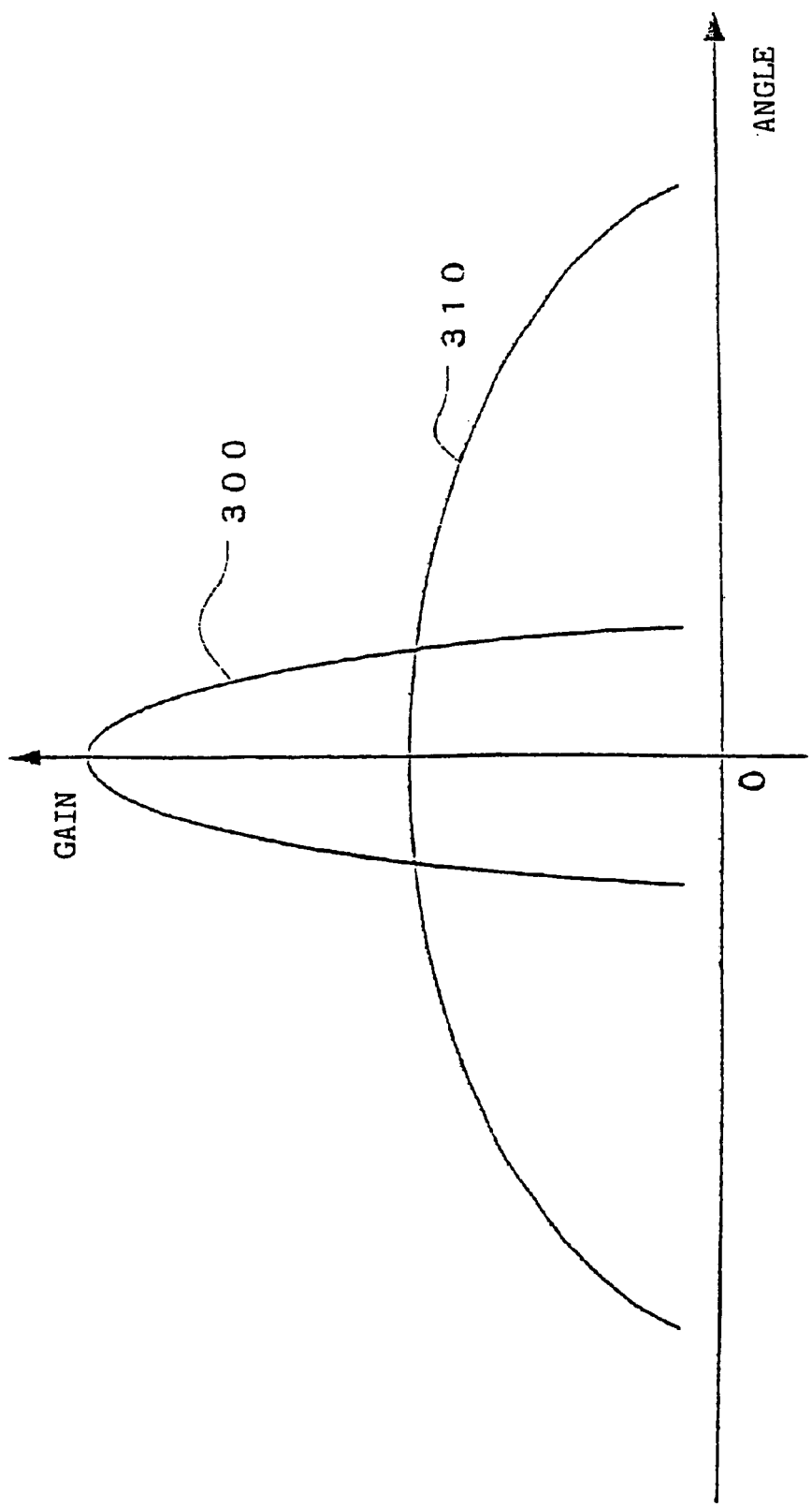
FIG. 1 is a schematic diagram showing a difference in gain depending on the inclination angle when a screen and a white board are viewed from the center of the reflected light obtained through direct reflection of projection light at a projection receiving surface when projection is performed from a projector onto a screen usually used for a projector or the like, and a so-called white board on which drawing can be done using a pen or the like and in which erasing is possible.
Figure 4:
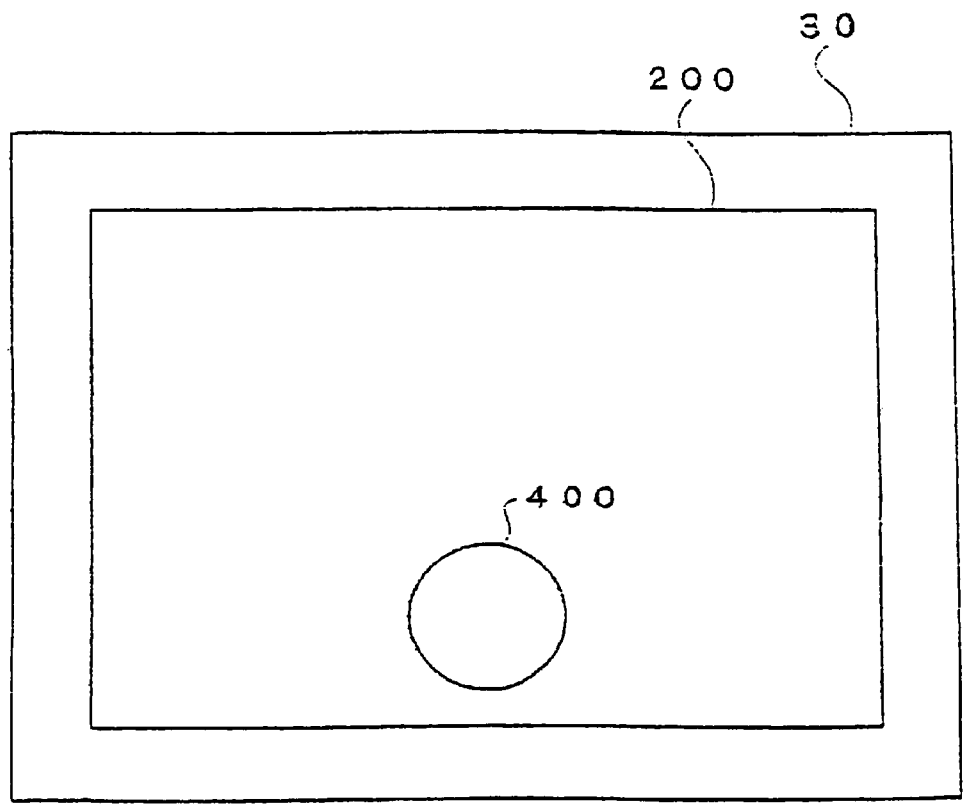
FIG. 4 is a schematic diagram showing a hot spot on a white board.

FIG. 1 is a schematic diagram showing a difference in gain depending on the inclination angle when a screen and a white board are viewed from the center of the reflected light obtained through direct reflection of projection light at a projection receiving surface when projection is performed from a projector onto a screen usually used for a projector or the like, and a so-called white board on which drawing can be done using a pen or the like and on which erasing is possible. FIG. 4 is a schematic diagram showing a hot spot 400 on a white board 30.

As shown in FIG. 1, in the case of the screen, the difference in gain value (brightness) depending on the above angle is small, as indicated by data 310, whereas in the case of the white board 30, the surface exhibits a high gain value near the angle of zero degrees as indicated by data 300.

This is due to the fact that the surface of the white board 30 has a high reflection characteristic due to the surface processing done for the purpose of preventing flaws, stains, etc. Thus, when the white board 30 is used as the projection surface onto which projection is to be performed by the projector, when the white board 30 is seen from within the region of the light directly reflected by the white board, it seems as if there is a circular region of high luminance called hot spot 400 in the projection region 200.

In this embodiment, the term "hot spot" means the high luminance portion in the projected image which is seen when the light source image of the light source lamp of the projector is reflected by a screen having a high reflection member.

When image taking is conducted in the condition in which the hot spot 400 is seen, that is, when the CCD camera takes in the reflected light of the hot spot 400, the dynamic range of the CCD camera is exceeded in the area where the image of the hot spot is taken in the image taking device array of the CCD, so that it is impossible to obtain correct image taking data around the hot spot 400, and the processing using the image taking data is adversely affected.

To prevent this, when the lens of the CCD camera is stopped, there is a deficiency in brightness of the other portion of the image taking device array other than the hot spot 400, and the SN (signal noise) deteriorates.

In this embodiment, to reduce the influence of the hot spot 400 and make it possible to process the image taking data in a satisfactory manner, a projection system nd a projector are used, in which the image taking portion such as the CCD camera is arranged outside the region of the direct reflection light from the projection portion of the projection light.

In a projector used in a recent projection system, a so-called gate projection optical system is adopted as the projection optical system.

Figure 2:
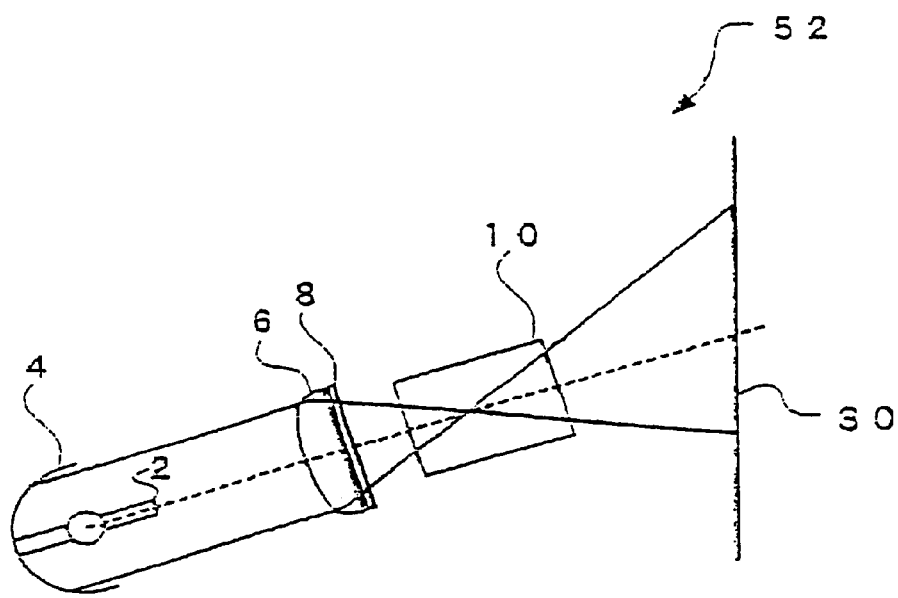
Figure 2:
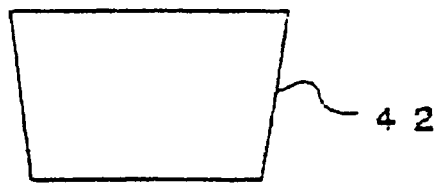

FIGS. 2(A)–(B) show an ordinary projection optical system in a projector, of which FIG. 2(A) is a principle diagram showing the ordinary projection optical system, and FIG. 2(B) is a diagram showing a projection image region 42 in the ordinary projection optical system projected onto a projection receiving portion. FIGS. 3(A)–(B) shows a projection optical system consisting of a gate projection optical system, of which FIG. 2(A) is a principle diagram showing the gate projection optical system, and FIG. 2(B) is a diagram showing a projection image region 40 in the gate projection optical system projected onto a projection receiving portion.

As shown in FIG. 2(A), a projector having an ordinary projection optical system may consist of a light source 2, a reflector 4 for forwardly reflecting the light from the light source 2, a condenser lens 6 for condensing the reflection light, a light valve 8 to which the light condensed by the condenser lens 6 is applied and which modulates it according to an image signal, and a projection lens 10 for projecting the light modulated by the light valve 8, projection being performed such that substantially the center of the projection light coincides with the optical axis indicated by the dotted line. While a transmissive type liquid crystal panel is used as the light valve 8, it is also possible to use a transmissive type modulating device other than a liquid crystal panel, or a reflective type modulating device such as a digital micromirror device (DMD).

In the actual presentation, the main body of the projector is set at a position lower than the white board 30 so that it may not be an obstacle to the field of view.

However, when projection is simply performed from a low position to a high position, the distance to the upper end of the projected image is larger than the distance to the lower end of the projected image, so that, as shown in FIG. 2(B), the upper portion of the projected image 42 is spread to cause a trapezoidal distortion.

To eliminate this trapezoidal distortion, a gate projection optical system as shown in FIG. 3(A) is adopted. In the gate projection optical system, the central axis (dotted line) of the light impinging upon the light valve 8 does not coincide with the optical axis of the projection lens 10, and the members are arranged such that the central axis of the projection light crosses the optical axis of the projection lens 10 at an angle. Further, arrangement is to be made such that the angle made by the output beam from the light valve 8 and the output surface is the same as the angle of the projection light projected onto the screen 30.

Thus, in the gate projection optical system, the light valve 8, the projection lens 10, and the white board 30 are arranged so as to be parallel to each other, and the projection light is projected upwardly.

As shown in FIG. 3(B), when a gate projection optical system is adopted, the projected image 40 is rectangular, and a trapezoidal distortion is not easily generated.

However, even when a gate projection optical system is adopted, the above-mentioned hot spot 400 is generated when projection is performed onto the white board 30 whose surface has a high reflectance, a white concrete wall or the like.

Figure 5:
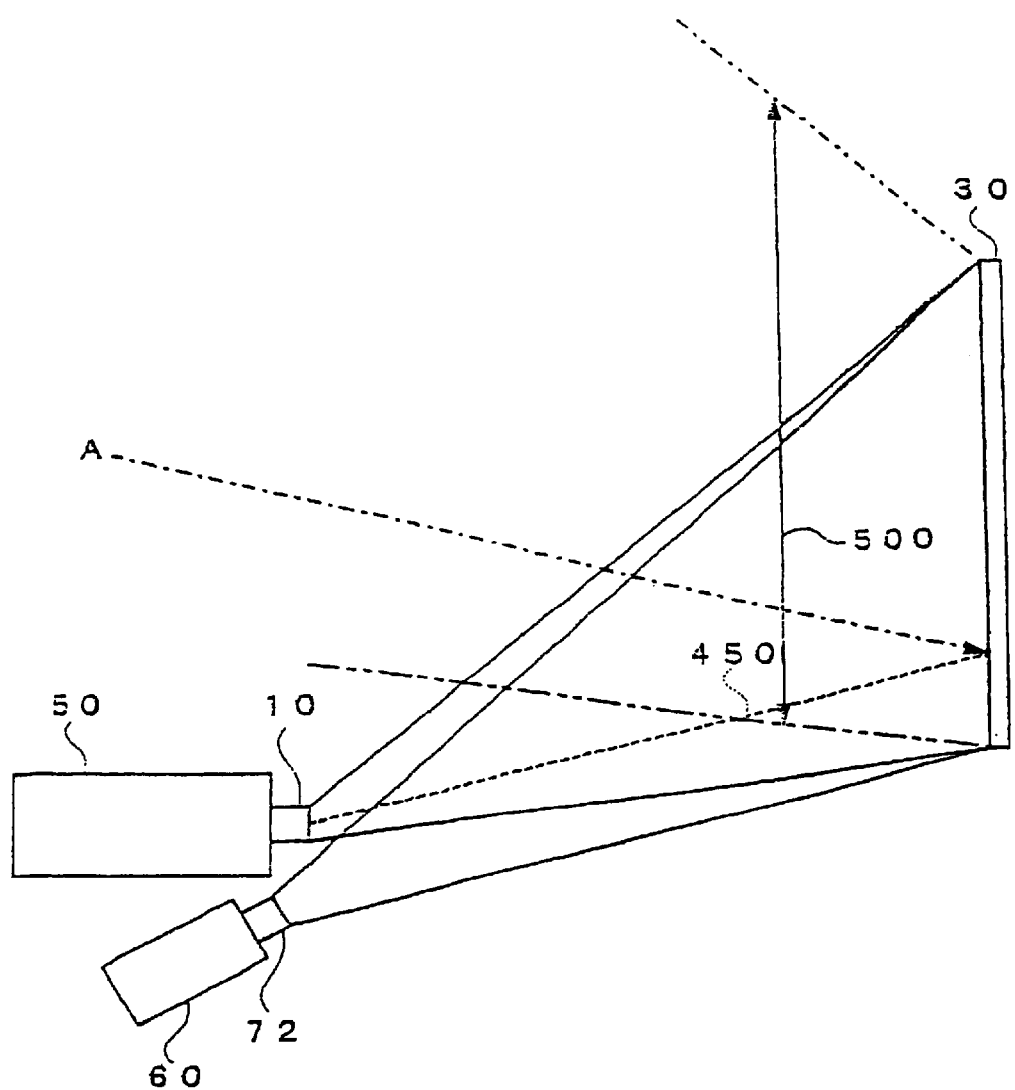
FIG. 5 is a schematic diagram showing the positional relationship between a projector according to the present invention, a CCD camera, and a white board

FIG. 5 is a schematic diagram showing the positional relationship between a projector 50, a CCD camera 60, and a white board 30 in a projection system using the projector 50 (which corresponds to the projector of FIG. 3 including the components 2, 4, 6, 8 and 10) and the CCD camera 60 constituting the image taking portion.

Usually, the orientation and the position of the CCD camera are determined such that the image of all the projection area on the white board 30 can be taken. On the other hand, a part of the projection light is reflected by the white board 30. When the position of the CCD camera 60 is included in the range of the direct reflection light from the white board 30, the CCD camera 60 is allowed to take the image of the hot spot 400 on the white board 30. More specifically, when the position of the image taking lens 72 of the CCD camera 60 is included in the range of the direct reflection light from the white board 30, the image of the hot spot 400 is taken.

For example, when an image displayed on the white board 30 by projection light from the projector 50 is taken by a CCD camera from a point of view A, the extension of the line of sight is within the range of the optical axis 450 of the projection light indicated by the dotted line and the direct reflection light from the white board indicated by the two-dot chain line, so that the line of sight is included in the hot spot generation range 500, and the hot spot 400 is generated on the white board 30, the image of the hot spot 400 being taken by the image taking portion.

In view of this, in the projection system of this embodiment, the image taking lens 72 of the CCD camera 60 constituting the image taking portion and, further, the main body of the image taking portion are positioned below the projector 50 constituting the projecting portion, and arranged at a position lower than the lower end of the projection area by the projection light on the white board 30 constituting the projection receiving portion. That is, the CCD camera 60 is arranged in such a way that the position of the CCD camera 60 is not in the range of the direct reflection light from the white board 30. More specifically, the CCD camera 60 is arranged in such a way that the position of the image taking lens 72 is not in the range of the direct reflection light from the white board 30. As a result, the hot spot 400 does not impinge upon the image taking lens 72 of the CCD camera 60. The CCD camera 60 applies the light of the projected image taken in by the image taking lens 72 to the image taking device array to convert the intensity of the light applied to each device into an electric signal.

Due to this arrangement, the image taking lens 72 of the CCD camera 60 is arranged outside the reflection range of the direct reflection light from the projection receiving portion by the light from the projected image, so that the image projected by the projector 50 is taken from a position outside the hot spot generation range 500, and it is possible to perform image taking without being influenced by the hot spot 400.

Due to this arrangement, it is possible to obtain correct image taking data. Further, while the processing such as the detection of the pointing position is effected on the basis of the image taking data by the processing portion provided in the projector 50, the image taking data is not influenced by the hot spot 400, so that it is possible for the processing portion to perform the processing in a satisfactory manner.

While a projection system to which the present invention is applied has been described, it is also possible to apply a projector in which the projecting portion and the CCD camera constituting the image taking portion are integrally formed.

Figure 6:
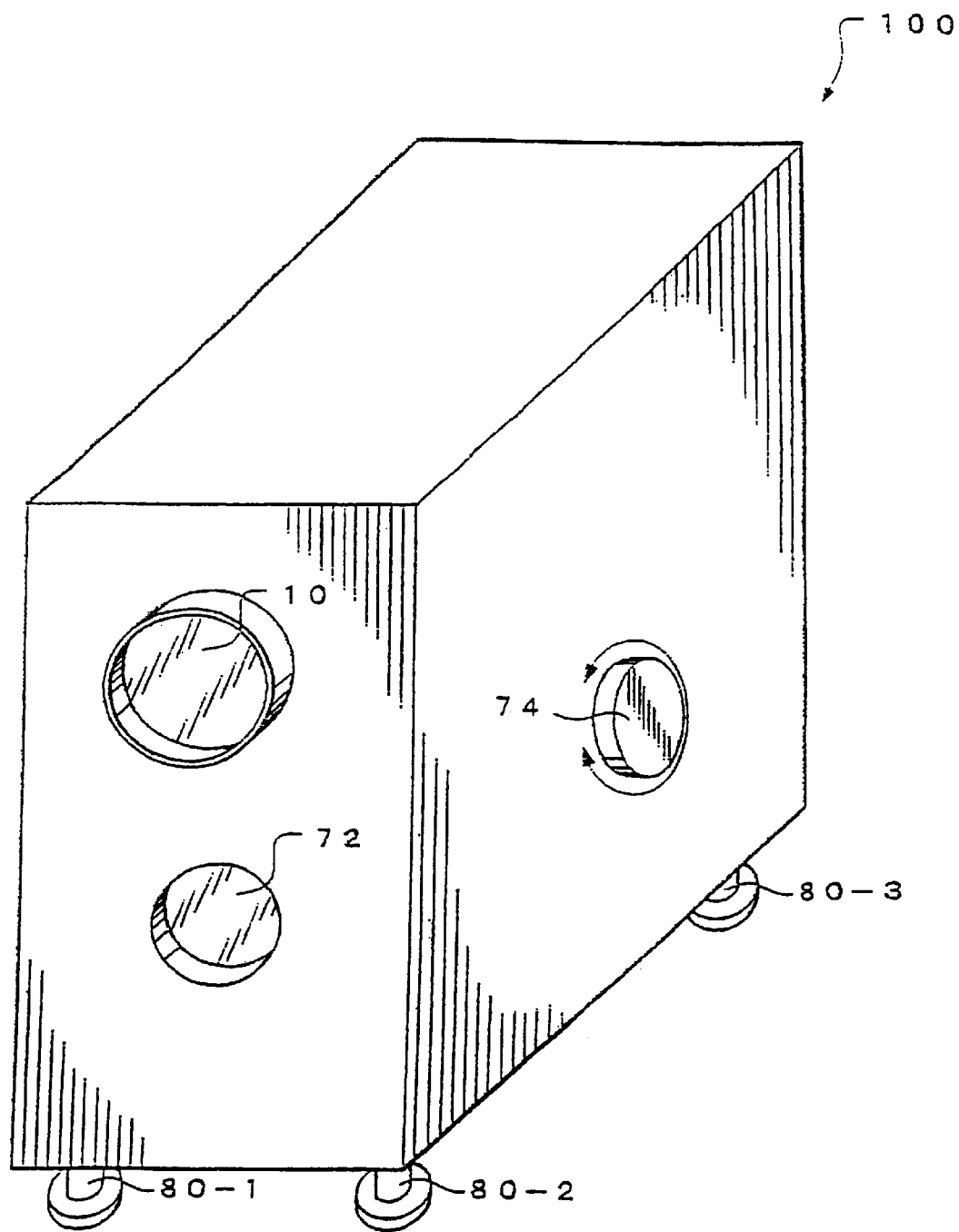
FIG. 6 is a diagram showing the outward appearance of a projector according to this embodiment.

FIG. 6 is an outward view of a projector 100 according to this embodiment. The projector 100 is a vertical projector, which contains the components indicated by numerals 2, 4, 6 and 8 of FIG. 3 in a case. On the front side, it has a projection lens 10 (which corresponds to the projection lens 10 of FIG. 3) and a lens 72 of a CCD camera (which corresponds to the lens of the CCD camera 60 of FIG. 5). Four leg portions 80-1 through 4 provided at the bottom of the case (of which the leg portion 80-4 is not shown) are expanded and contracted to make it possible to adjust the height and angle.

In this integral type projector 100 also, in which the projecting portion and the image taking portion are integrally formed in a case, it is desirable that the image taking lens 72 of the CCD camera be arranged at a portion lower than the lowermost end of the projection receiving portion.

By integrally providing the projection lens 10 constituting the projecting portion and the CCD camera, it is possible to easily conduct the adjustment of the position and angle of each portion.

Further, it is desirable that the image taking angle of the CCD camera be formed so as to be adjustable with respect to the optical axis of the projection lens 10.

The projector 100 of this embodiment includes a driving portion for adjusting the image taking angle of the CCD camera and an angle adjusting dial 74 for the image taking lens 72 of the camera driving the driving portion. When the user manually adjusts the angle adjusting dial 74, the orientation of the image taking lens 72 of the CCD camera is adjusted.

In this way, it is possible to manually and directly conduct the adjustment. However, for example, it is also possible to provide a driving portion for adjusting the image taking angle of the CCD camera and a remote control unit for driving the driving portion, adjusting the image taking angle of the CCD camera through remote control using the remote control unit.

Further, it is also possible to adopt a construction in which the image taking angle of the image taking lens 72 of the CCD camera is adjusted in synchronous with the focus adjustment of the projection lens 10.

In this arrangement, even when the position and projection angle of the projection lens 10 and the white board 30 are changed, it is possible to adjust the image taking angle of the image taking lens 72 of the CCD camera accordingly, making it possible to obtain correct image taking data.

While a preferred embodiment of the present invention has been described, the present invention is not restricted to the above-described embodiment.

For example, while in the above-described embodiment the projector 100 is installed on the floor, it is also possible to form the projector as a suspension type projector.

Figure 3:
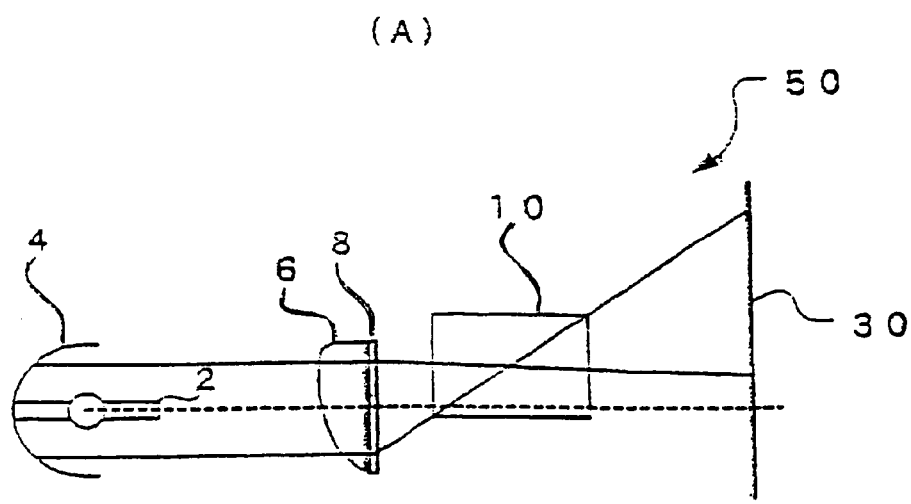
Figure 3:
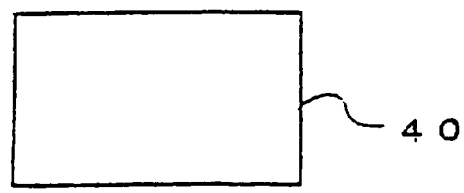

In this case, the projector is arranged on the ceiling side, and the projecting portion of the projector performs downward flapping. That is, the vertical position relationship of FIGS. 3, 5 and 6 is reversed, and an image is projected downwardly from the projection lens 10. Thus, in the case of this arrangement, the image taking lens 72 of the image taking portion 60 of FIG. 5 or the image taking lens 72 of FIG. 6 is arranged at a position higher than the upper end of the projection area on the projection receiving portion having a highly reflective member (in FIG. 3, a position below the projection lens 10, and in FIG. 5, a position below the projector 50), whereby it is possible to reduce the influence of the hot spot 400 and obtain satisfactory image taking data.

While in this embodiment of the present invention, a single plate type projector, in which the light source light is modulated by using a single light valve 8, this should not be construed restrictively. It is also possible to use a three-plate type projector in which light emitted from a light source 4 is separated into three colors of red, blue and green by a light separation portion consisting of two dichroic mirrors or a cross-dichroic prism, the three color lights being modulated in accordance with image signals of the color lights in correspondence with three modulating devices 8, the three color lights after modulation being synthesized by a light synthesizing portion consisting of two dichroic mirrors or a cross-dichroic prism, the synthesized light being projected onto a screen 30 by a projection lens 10. Industrial Applicability The present invention is applicable to a projection system and a projector in which a projected image is taken by using an image taking portion.

What is claimed is:

1. A projection system, comprising:
   a projecting portion that projects image light onto a predetermined projection receiving portion;
   an image taking portion having an image taking lens, that captures a projected image on the projection receiving portion; and
   a processing portion that performs a predetermined processing based on an image capturing result obtained by the image taking portion,
   the image taking lens of the image taking portion being arranged outside a reflection region of direct reflection light of the projected image.

2. The projection system according to claim 1,
   the projecting portion having a projection optical system in which projection light is projected upwardly, and
   the image taking lens of the image taking portion being arranged at a position lower than a projection area on the projection receiving portion.

3. The projection system according to claim 1, the projection receiving portion being formed of a highly reflective member having a predetermined reflectance.

4. A projector having a projecting portion that projects light of an image to a predetermined projection receiving portion, the projector comprising:
   an image taking portion having an image taking lens, that captures a projected image on the projection receiving portion,
   the image taking lens of the image taking portion being arranged outside a reflection region of direct reflection light of the projected image.

5. The projector according to claim 4,
   the projecting portion having a gate projection optical system in which projection light is projected upwardly, and
   the image taking lens of the image taking portion being arranged at a position lower than a lower end of a projection region receiving projection by the gate projection optical system.

6. The projector according to claim 4,
   the projecting portion having a gate projection optical system in which projection light is projected downwardly, and
   the image taking lens of the image taking portion being arranged at a position higher than an upper end of a projection region receiving projection by the gate projection optical system.

7. The projector according to claim 4, the projecting portion and the image taking portion being integrally formed.

8. The projector according to [one of claims 4 through 7, claim 4, an angle at which image taking is performed by the image taking lens of the image taking portion being adjustable with respect to an optical axis of the projecting portion.

9. The projector according to claim 4, the projection receiving portion being formed of a highly reflective member having a predetermined reflectance.

10. The projection system according to claim 1,
    the projecting portion having a projection optical system in which projection light is projected downwardly, and
    the image taking lens of the image taking portion being arranged at a position higher than a projection area on the projection receiving portion.

* * * * *

UNITED STATES PATENT AND TRADEMARK OFFICE
CERTIFICATE OF CORRECTION

PATENT NO. : 6,499,847 B1
DATED : December 31, 2002
INVENTOR(S) : Kunio Yoneno

It is certified that error appears in the above-identified patent and that said Letters Patent is hereby corrected as shown below:

<u>Title page,</u>
Item [30], please change: "Foreign Application Priority Data,
Mar. 19, 1999   (JP).........................11-0747551" to
-- Foreign Application Priority Data,
Mar. 19, 1999   (JP).........................11-074751 --

Signed and Sealed this

Sixth Day of May, 2003

JAMES E. ROGAN
*Director of the United States Patent and Trademark Office*